United States Patent [19]
Lamb et al.

[11] 3,980,824
[45] Sept. 14, 1976

[54] MODULATOR DEMODULATOR FOR BINARY DIGITALLY ENCODED MESSAGES

[75] Inventors: James A. Lamb, Hoffman Estates; Donald J. Nieglos, Arlington Heights, both of Ill.

[73] Assignee: Motorola, Inc., Schaumburg, Ill.

[22] Filed: Oct. 29, 1974

[21] Appl. No.: 518,860

[52] U.S. Cl. .................................... 178/67; 325/30
[51] Int. Cl.² ........................................ H04L 27/18
[58] Field of Search .................. 178/66 R, 67, 68; 325/30, 38 R; 340/170; 332/9 R, 16; 328/133, 140, 141

[56] References Cited
UNITED STATES PATENTS

| | | | |
|---|---|---|---|
| 3,204,029 | 8/1965 | Groft et al. | 178/66 R X |
| 3,459,892 | 8/1969 | Shagena et al. | 178/68 |
| 3,699,445 | 10/1972 | Kinsel | 178/66 R X |

*Primary Examiner*—Benedict V. Safourek
*Attorney, Agent, or Firm*—Eugene A. Parsons; James W. Gillman

[57] ABSTRACT

In a communications system utilizing binary messages, a modulator for differentially modulating the messages, i.e. a change in the differentially encoded data is produced for every "one" in the data stream and no change occurs for every "zero" in the data stream, the differentially encoded data is modulated by a square wave signal having a predetermined number of cycles per bit of information, and the output is passed through a band pass filter to remove a substantial portion of the upper side band, and the DC. In the demodulator the modulated, differentially encoded message is applied to one input of an exclusive OR and the same message is delayed one bit and applied to a second input of the exclusive OR to remove the modulation and differential encoding, after which the message is integrated and shaped to place the message in the original binary form.

5 Claims, 5 Drawing Figures

3,980,824

MODULATOR DEMODULATOR FOR BINARY DIGITALLY ENCODED MESSAGES

BACKGROUND OF THE INVENTION

Field of the Invention

In communications systems information can be transmitted and received in a variety of forms. The present disclosure applies to communications systems wherein binary messages or data is transmitted between geographically separated transmitter-receiver units. In general, it is desirable to transmit information between the units of the present system which is compatible with units of other systems presently in use. For example, in private line paging systems, of the type manufactured and sold by the assignee, transceivers are utilized which operate in a frequency range of approximately 300 to 3,000 Hz and control signals are transmitted in the frequency spectrum from zero to 300 Hz and above 2,000 Hz. Therefore, if the present system is to be compatible with the private line paging systems it must operate in a frequency range between 300 and 2,000 Hz. The apparatus disclosed herein is a modulator-demodulator constructed to render the present communications system compatible with other communications systems in which the present system may be completely or partially incorporated.

Description of the Prior Art

In prior art systems, to provide a communications system which is compatible with other systems, signals are modulated and transmitted as single side band signals. In these systems, to recover the original information in a demodulator, the original carrier must be reinserted and, in many instances, timing pulses must be generated from transmitted timing signals. The reinsertion of the carrier and the timing of the information requires relatively complicated circuitry and greatly increases the cost and complexity of the transceiver units in the system.

SUMMARY OF THE INVENTION

The present invention pertains to a communications system including a modulator wherein binary messages are differentially encoded, modulated to shift the frequency spectrum thereof upwardly, and filtered to remove unwanted portions of the spectrum including substantially one side band thereof and a demodulator wherein the received message is applied to one input of a comparing circuit and the received message delayed a predetermined amount is applied to a second input of the comparing circuit to remove the modulation and differential encoding, after which the message is integrated to provide the original message.

It is an object of the present invention to provide new and improved modulating-demodulating apparatus for a communications system utilizing binary messages.

It is a further object of the present invention to provide new and improved modulating-demodulating apparatus which provides signals for transmission that are compatible with other communications systems.

It is a further object of the present invention to provide new and improved modulating-demodulating apparatus which provides compatible signals with substantially less complexity than prior art systems.

These and other objects of this invention will become apparent to those skilled in the art upon consideration of the accompanying specification, claims and drawings.

BRIEF DESCRIPTION OF THE DRAWINGS

Referring to the drawings.

DESCRIPTION OF THE PREFERRED EMBODIMENT

Figure 1:
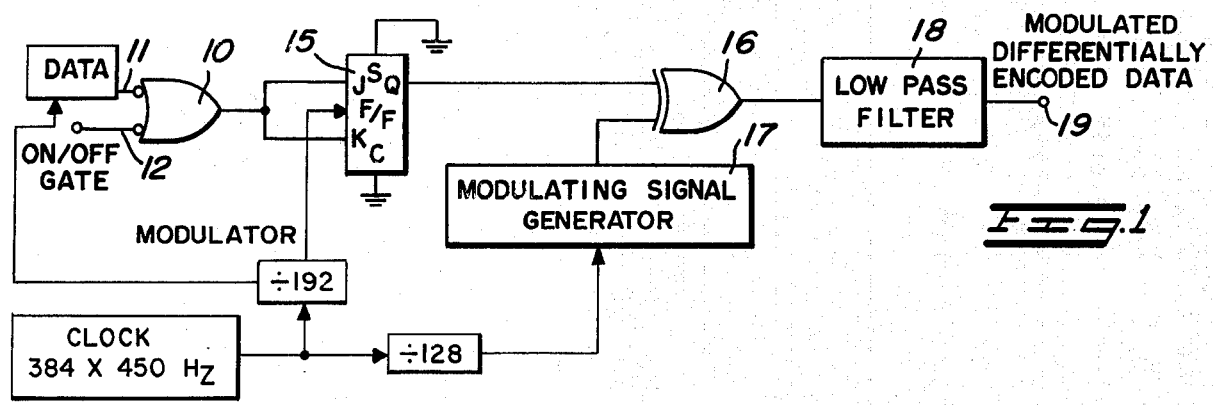
FIG. 1 is a block diagram of a modulator constructed in accordance with the teachings of the present invention.

Referring specifically to FIG. 1, the numeral 10 designates a NAND gate having a first input 11 and a second input 12. The input 12 is connected to an on/off gate (not shown) which causes the NAND gate 10 to operate as a switch. The input 11 is connected to receive binary data from a source not shown. The output of NAND gate 10 is applied to J and K inputs of a clocked flip-flop 15. The non-inverted output of the flip-flop 15 is applied to one input of an exclusive OR gate 16, a second input of which is connected to a modulating signal generator 17. The output of the exclusive OR gate 16 is applied through a low pass filter 18 to an output terminal 19.

Figure 3:
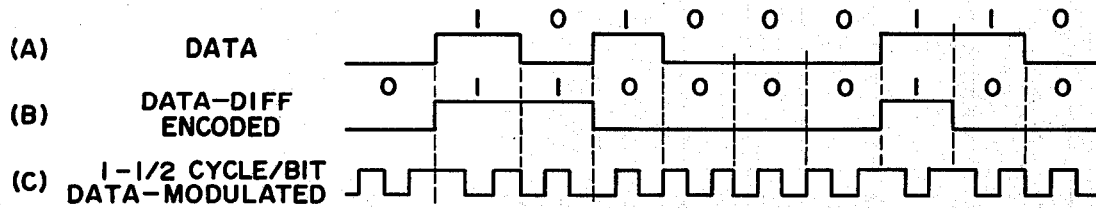
FIG. 3 illustrates wave forms present at various points in the block diagram of FIG. 1.

In the operation of the modulator illustrated in FIG. 1 a stream of binary data, such as illustrated in A of FIG. 3, is applied to the input of NAND gate 10. With the proper signal supplied from the on/off gate to the input 12, the NAND gate 10 passes the stream of data to the inputs J and K of the flip-flop 15. The flip-flop 15 is a differential encoder which supplies a change at the output when the input data is a "one" and supplies no change at the output when the input data is a "zero". The wave form produced at the output of the flip-flop 15, when the wave form illustrated in A of FIG. 3 is applied to the inputs, is illustrated by wave form B of FIG. 3. It should be understood that other differential encoders might be devised by those skilled in the art and any circuit may be utilized which will provide a change in the output data when a one is supplied to the input and no change in the output data when a zero is supplied to the input. The differentially encoded data is applied to one of the inputs of the exclusive OR gate 16 while a modulating signal is applied to the other input from the modulating signal generator 17. In the present embodiment the information applied to input 11 of NAND gate 10 is supplied from a 900 bit per second system and the modulating signal from the generator 17 is operating at 1½ cycles per bit, or 1350 Hz. The modulated, differentially encoded signal, which is illustrated in C of FIG. 3, is applied through the low pass filter 18 to the output terminal 19. The low pass filter 18 removes a substantial portion of the upper side band and any other undesirable signals thereabove.

Figure 4:
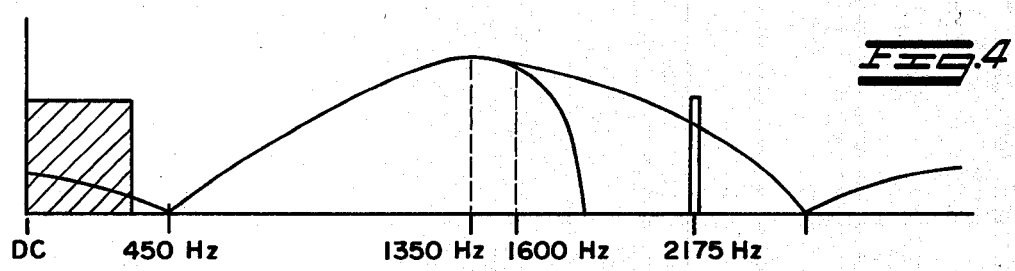
FIG. 4 is a graphical representation of the frequency spectrum of the messages produced by the modulator of FIG. 1.

Referring specifically to FIG. 4, modulating the 900 bit per second data with the 1350 Hz signal moves the frequency spectrum of the data upwardly so that components below approximately 450 Hz are harmonic components and are not required for recovery of the data. The circuit is, therefore, compatible with private line papers and the like. Because the components below 450 Hz are not required the need for DC audio response in transceivers utilizing the present modulator is eliminated and the transceivers can be greatly simplified. Further, because the low pass filter 18 removes undesirable portions of the upper side band and any components thereabove, the communications system utilizing the present modulator is also compatible with many tone control systems now on the market which operate at approximately 2175 Hz. It will, of course, be understood by those skilled in the art that the specific number of bits per second utilized in the system incorporating the modulator, the modulating frequency from the signal generator 17 and the cut-off frequency of the low pass filter 18 will all depend upon the requirements of the communications system and the frequency, etc. of the systems with which it is to be compatible.

Figure 2:
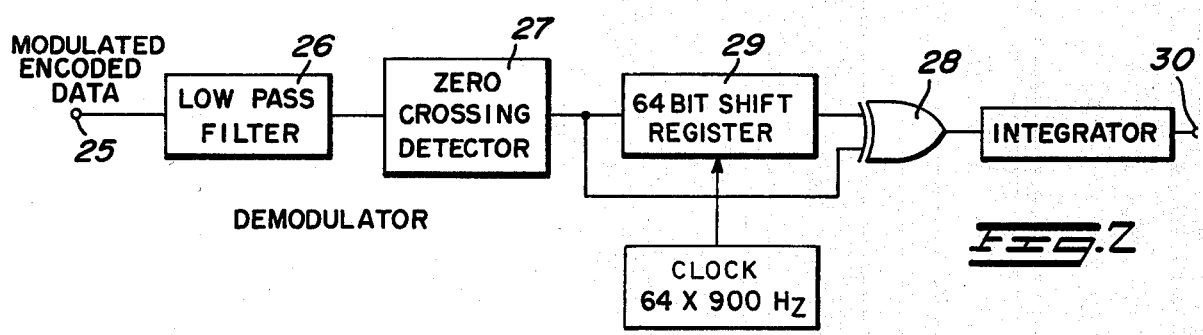
FIG. 2 is a block diagram of a demodulator constructed in accordance with the teachings of the present invention.

Referring specifically to FIG. 2, a demodulator is illustrated which is designed for use with the modulator of FIG. 1. The demodulator has an input terminal 25 adapted to receive a modulated, differentially encoded signal. The signal applied to the terminal 25 is passed through a low pass filter 26 and a zero crossing detector 27. The output of the zero crossing detector 27 is supplied to one input of an exclusive OR gate 28 and the output of the zero crossing detector is also supplied through a one bit delay line 29 to a second input of the exclusive OR gate 28. The output of the exclusive OR gate 28 is supplied through an integrator 29 to a data output terminal 30.

Figure 5:
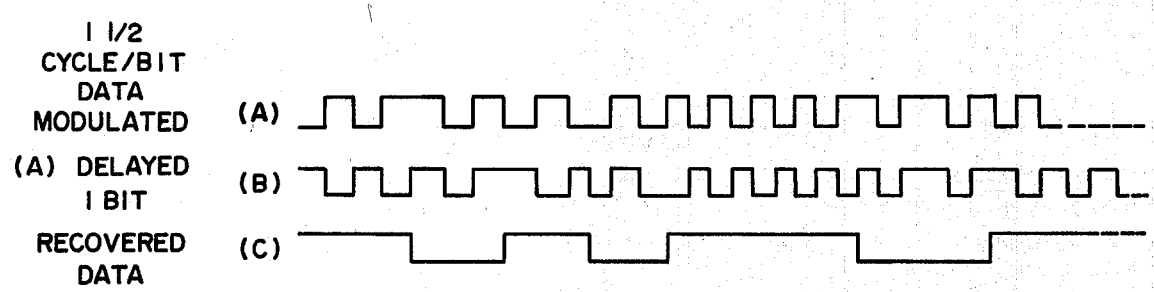
FIG. 5 illustrates wave forms present at various points in the block diagram of FIG. 2.

In the operation of the demodulator illustrated in FIG. 2, a data stream, such as that illustrated by wave form C in FIG. 3 or wave form A in FIG. 5, is applied to the input terminal 25. It will, of course, be understood by those skilled in the art that the transmitted signal will not appear exactly as illustrated in wave form C of FIG. 3 or wave form A of FIG. 5 but will be more in the nature of a sine wave. This sine wave is applied to the low pass filter 26 to remove high frequency noise and any other undesirable higher frequency components. The signal from the low pass filter 26 is then passed through a zero crossing detector 27 which provides substantially the wave form illustrated in C of FIG. 3 or A of FIG. 5. These wave forms are, of course, somewhat ideal and are simply intended for illustrative purposes. The data stream illustrated by wave form A of FIG. 5 is applied directly to one input of the exclusive OR gate 28 and, through a one bit delay line 29 to the other input of the exclusive OR gate 28. The delayed data stream applied to the second input of the exclusive OR gate 28 is illustrated by wave form B of FIG. 5. The exclusive OR gate 28 has the property of providing a zero at the output thereof whenever both of the inputs are the same and providing a one at the output thereof whenever the inputs differ. Thus, by comparing the wave forms A and B of FIG. 5 it can be seen that the output of the exclusive OR gate 28 will be the original data (wave form A of FIG. 3) inverted. The modulating signal is cancelled in the exclusive OR gate 28 because the modulating signal in the delayed data stream is 180° out of phase with the modulating signal in the undelayed data stream. To achieve this result the signal from the modulating signal generator 17 should be a multiple of one-half cycle per bit and no less than one cycle per bit to achieve the shift in frequency spectrum. In addition, because the differential encoding produced a change in the data whenever a one was applied thereto and no change in the data when a zero was applied thereto, comparing one bit to a previous bit in the demodulator produces the reverse action, i.e. if a selected bit and the previous bit are both ones or zeroes the data bit was a zero and if the selected bit and the previous bit are a one-zero or zero-one the data bit was a one. Thus, the combination of the delayed signal and the undelayed signal applied to the inputs of the exclusive OR gate 28 removes the modulation and the differential encoding to supply the original data. It will of course be noted that the data requires inversion in the disclosed system, but if the modulating signal supplied by the generator 17 is increased one-half cycle per bit the data from the exclusive OR gate 28 will be in the same sense as the original data.

The integrator 29 operates as a filter to remove any extraneous pulses, etc. In the present embodiment, the one bit delay line 29 is a 64 bit shift register clocked at 64 times the bit rate to provide a one bit delay, but it should be understood that many other delay lines might be utilized and that different amounts of delay might be required, depending upon the type of signal being applied at the input terminal 25 and the frequency of the modulating signal from the generator 17. Further, an exclusive OR gate 28 is utilized to compare the delayed and undelayed data streams but it should be understood by those skilled in the art that many other types of comparing circuits might be utilized which will provide the desired function.

Thus, modulating-demodulating apparatus is disclosed which can be utilized to provide output signals compatible with other communicating systems and, further, which is relatively simple to implement. While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

We claim:

1. In a communications system utilizing binary messages, modulating-demodulating apparatus comprising:
 a. a differential encoder having an input connected to receive the binary messages and an output, said differential encoder providing a binary signal at the output thereof which changes levels when the binary message is a first level and which remains unchanged when the binary message is a second level;
 b. a modulator connected to the output of said differential encoder and modulating the differentially encoded message at a predetermined number of cycles per bit of information;
 c. filter means connected to said modulator for receiving the modulated differentially encoded message and passing only a predetermined portion of the frequency spectrum of the message while removing substantially one side band thereof; and
 d. means attached to said modulator for providing a modulating signal having a frequency which is a multiple, greater than one, of one-half cycles per bit.

2. In a communications system utilizing binary messages in the audio frequency range, modulating-demodulating apparatus comprising:
   a. clock means providing a signal at the bit rate of the binary messages;
   b. a differential encoder having an input connected to receive the messages and an output and further connected to said clock means for receiving the clock signal therefrom, said differential encoder providing a binary signal at the output thereof which changes levels when the message is a first level and a clock signal is present and which remains unchanged when the message is a second level and a clock signal is present;
   c. a modulator connected to the output of said differential encoder and modulating the differentially encoded message at a predetermined number of cycles per bit of information;
   d. a low pass filter connected to said modulator for receiving the modulated differentially encoded message and passing only a predetermined portion of the frequency spectrum of the message while removing substantially the upper side band thereof; and
   e. a demodulator circuit coupled to receive the modulated, differentially encoded message at an input circuit thereof, said demodulator including a one bit delay circuit connected to receive the message from said input circuit, a two input comparing circuit having one input connected to said input circuit and the other input connected to said delay circuit for comparing each bit in the message to an adjacent bit and removing the modulation and differential encoding.

3. In a communications system, the modulating-demodulating apparatus claimed in claim 2 wherein the two input comparing circuit is an exclusive OR circuit.

4. In a communications system utilizing phase shift keyed binary messages in the audio frequency range, modulating-demodulating apparatus comprising:
   a. wave shaping means connected to receive a phase shift modulated, differentially encoded, binary message;
   b. a one bit delay circuit connected to receive the message from said wave shaping means and delay the message a predetermined time, said delay circuit including a N-bit shift register clocked at a rate of N times per bit; and
   c. a two input phase comparing circuit having one input connected to said delay circuit to receive the delayed message and the second input connected to said wave shaping means to receive the message for comparing the message and delayed message to remove the modulation and differential encoding.

5. In a communications system, the modulating-demodulating apparatus set forth in claim 4 further including an integrator connected to an output of the comparing circuit.

* * * * *